United States Patent
Shrivastava et al.

(10) Patent No.: US 11,841,859 B1
(45) Date of Patent: Dec. 12, 2023

(54) DISTRIBUTED DATA STORAGE FRAMEWORK

(71) Applicant: Options Clearing Corporation, Chicago, IL (US)

(72) Inventors: Apoorve Shrivastava, Frisco, TX (US); Srinivasa Somepalli, Frisco, TX (US); Ram Nagpure, Naperville, IL (US); Krishna C Palavarapu, Avenel, NJ (US)

(73) Assignee: Options Clearing Corporation, Chicago, IL (US)

( * ) Notice: Subject to any disclaimer, the term of this patent is extended or adjusted under 35 U.S.C. 154(b) by 0 days.

(21) Appl. No.: 17/587,145

(22) Filed: Jan. 28, 2022

(51) Int. Cl.
  *G06F 16/22* (2019.01)
  *G06F 16/2455* (2019.01)

(52) U.S. Cl.
  CPC ........ *G06F 16/24552* (2019.01); *G06F 16/22* (2019.01)

(58) Field of Classification Search
  CPC .................. G06F 16/24552; G06F 16/22
  See application file for complete search history.

(56) References Cited

U.S. PATENT DOCUMENTS

| | | | |
|---|---|---|---|
| 5,218,695 A * | 6/1993 | Noveck | G06F 16/10 |
| 9,020,900 B2 * | 4/2015 | Vijayan Retnamma | G06F 16/22 707/698 |
| 10,621,156 B1 * | 4/2020 | Morkel | G06F 16/2393 |
| 2005/0210218 A1 * | 9/2005 | Hoogterp | H04L 67/1097 711/159 |
| 2011/0302164 A1 * | 12/2011 | Krishnamurthy | G06F 16/90335 707/E17.014 |
| 2014/0059017 A1 * | 2/2014 | Chaney | G06F 16/284 707/736 |
| 2014/0351233 A1 * | 11/2014 | Crupi | G06F 16/24568 707/706 |
| 2019/0149619 A1 * | 5/2019 | Lisac | H04L 67/51 709/203 |
| 2020/0394196 A1 * | 12/2020 | Shivanna | G06F 16/2322 |
| 2021/0320794 A1 * | 10/2021 | Auh | G06F 16/9024 |
| 2021/0365464 A1 * | 11/2021 | Willcox | G06F 16/24573 |
| 2023/0123554 A1 * | 4/2023 | Allen | G06F 8/65 717/170 |

* cited by examiner

*Primary Examiner* — Merilyn P Nguyen
(74) *Attorney, Agent, or Firm* — Greenberg Traurig, LLP

(57) ABSTRACT

A method for operating a database includes receiving, from a user, data and an instruction to store the data in a key-value based database, determining a context of the data, selecting, according to the determined context, a data write routine, writing the data and its context to the database using the selected data write routine, and writing the data to a cache associated with the database. In addition, indexes may be created in the database and cache separate from the native indexes of the database and cache.

16 Claims, 3 Drawing Sheets

DISTRIBUTED DATA STORAGE FRAMEWORK

BACKGROUND

This disclosure relates to database management, including management of a key-value database.

DETAILED DESCRIPTION

Known database systems, particularly database systems that service a large volume of data from diverse input data sources, generally do not perform all data writes at a high rate without requiring a high degree of end user customization. The instant disclosure improves upon known database systems by, among other things, automatically selecting a write routine from a plurality of write routines that is most appropriate for an efficient write operation for the given data. As a result, a large volume of many different types of data may be stored quickly and efficiently with minimal user customization required. In addition, data may be stored on conjunction with its context metadata, enabling simple transfer of data between database and cache and rehydration of data to cache. Still further, an index may be maintained in both the database and cache that is additional to the native indexes of the database and cache. These additional indexes may be updated continuously, enabling tighter coupling between the index and the underlying data. In some embodiments, the index may be linked to the underlying data via bitemporal data retrieval.

Figure 1:
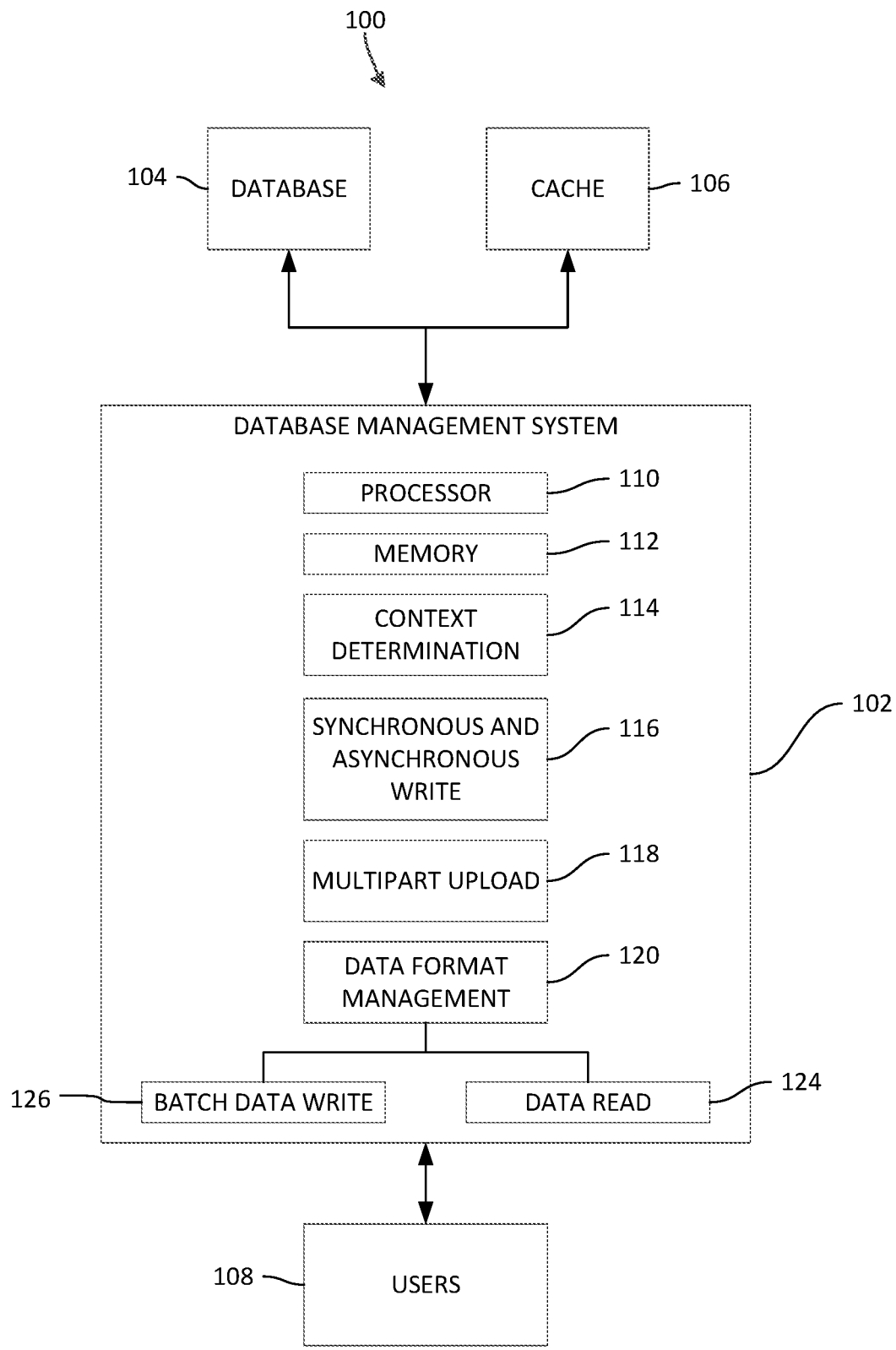
FIG. 1 is a block diagram view of an example database system.

Referring to the drawings, wherein like reference numerals refer to the same or similar elements across figures, FIG. 1 is a block diagram view of an example database system 100. The system 100 may include a database management system 102 (which may be referred to herein simply as the management system 102), a database 104, a cache 106, and one or more data sources 108, which data sources are or include users of the database 104.

The database 104 may be or may include a cloud storage database. The database 104 may be or may include a key-value database. Accordingly, the database 104 may assign a key (or key name) to each data object stored in the database. For example, the database 104 may be or may include an AMAZON® S3 database.

The cache 106 may be an in-memory data store. The cache 106, like the database 104, may be or may include a key-value data store. In some embodiments, the cache 106 may be a REDIS® data store. As will be appreciated by a person of ordinary skill in the art, the cache 106 may be faster than the database 104 for servicing data read and data write requests, in some embodiments, but may be less suitable for long-term storage of data and may have less storage volume than the database 104.

The data sources 108 may be or may include a plurality of continuous and/or discrete (e.g., batch) data that may provide data to be written to the database 104 and read data from the database 104. The data sources may provide data to be stored in different input file formats from each other, in some embodiments. The data sources 108 may issue synchronous and/or asynchronous commands to read data from, and write data to, the database 104, in embodiments.

The management system 102 may be in communication with the data sources 108, the database 104, and the cache 106 and may serve as an intermediary between the data sources 108 and the database 104 and cache 106. The data sources 108 may issue commands to write data to, and read data from, a database. The management system 102 may receive those commands and manage the flow of data to and from the database 104 and cache 106 to service the commands from the data sources 108. The management system 102 may service commands in a manner such that a data source 108 issuing a command does not know whether a particular commands is serviced from the database 104 or the cache 106; the data source 108 may simply issue a command, without specifying database or cache, and the management system 102 may determine the most efficient way to service that request.

The management system 102 may include a processor 110 and a non-transitory, computer-readable memory 112 storing instructions that, when executed by the processor 110, cause the management system 102 to perform one or more of the processes, steps, methods, operations, algorithms, etc. of this disclosure. The management system 102 may further include one or more functional modules 114, 116, 118, 120, 122, which modules may be embodied in software (e.g., instructions in the memory 112) and/or hardware. Although the management system 102 is illustrated with a single processor 110 and a single memory 112, the management system 102 and its functionality described herein may be performed by and/or distributed across multiple processors and memories (e.g., even where identified as performed by a single processor and/or single memory).

The management system 102 may include a context determination module (e.g., context resolver) 114 that may determine a context of the data of each data write command received from a data source 108 and generate metadata respective of that context. The context may include, for example, whether the data is continuous (e.g., in time) or discontinuous (e.g., batch data), the time slice associated with a continuous data portion, a unique identifier for the data (separate from any identifier that may be assigned by the database 104 and/or cache 106) an expiration of the data (e.g., time to live (TTL)), an error handling strategy (e.g., how many times to retry a failed write), a group mapping, and/or an input file format (e.g., the format in which the data is provided by the data source 108), in embodiments. One or more aspects of a context may be automatically determined by the management system 102 based on the data itself or its source 108 (e.g., whether data is continuous or batch). One or more aspects of a context may be user-defined and read by the management system 102 from metadata in or with a command from the data source 108, such as the expiration or error handling strategy. One or more aspects of a context may be assigned by the management system 102, such as a unique identifier.

Based on the determined context and metadata representative of that context, the management system 102 may select a routine or module from a plurality of routines or modules to service the command from the data source 108. The modules may differ from each other in storage format and storage media (e.g., database 104 and/or cache 106), in some embodiments. Example routines or modules are discussed below.

The management system 102 may further include an asynchronous and synchronous data write module or routine 116 that may service data write commands for continuous data. The asynchronous and synchronous data write module 116 may accept data in one or more file formats and may write data to the database 104 in one or more formats. For example, the input file format may be PROTO, POJO, BYTE ARRAY, or another flexible file format amenable to multiple types of data. The output file format may be JSON or the original file format in which the data was received and written. The asynchronous and synchronous data write module 116 may write data according to a synchronous process or an asynchronous process.

Data writes may be performed in a data format selected by the user, which format may be selected by the user according to needs of specific data. For example, PROTO occupies a small space and is highly portable and supports schema evaluation, so the producer and consumers of the data do not need to be aligned on same version of proto schema. Similarly PARQUET offers columnar storage format something that may be highly useful if someone wants to run SQL-like queries on this data. Of these three formats, JSON is the bulkiest format but is highly user friendly.

The management system 102 may further include a multipart upload module or routine 118. The multipart upload module 118 may be configured to batch data into multiple parts. For example, in a pipeline of unbounded data, temporal windows of the data may be created to give a data a bounded appearance. For example, data continuously arriving for two minutes may be batched in windows of every ten seconds to avoid overwhelming the systems with lot of data or slowing it down processing a large amount of data at a single time.

The management system 102 may further include a batch data write module or routine 126 that may service data write commands for batch data. The batch data write module 126 may accept data in one or more file formats and may write data to the database 104 in one or more formats. In some embodiments, the batch data write module 126 may accept the same one or more input file formats as the asynchronous and synchronous write module 116, but may write data in a different one or more file formats from the asynchronous and synchronous write module 116. For example, the input file format may be PROTO, POJO, or another flexible file format amenable to multiple types of data. The output file format may be JSON, PARQUET, etc.

The management system 102 may further include a cache write module or routine that may service data write commands for both continuous data and for batch data. The cache write module 120 may accept data in one or more file formats and may write data to the cache 106 in one or more formats. In some embodiments, the cache write module may accept the same one or more input file formats as the asynchronous and synchronous data write module and/or the batch data write module 126, but may write data in a different one or more file formats from the asynchronous and synchronous data write module and/or the batch data write module 126. For example, the input file format may be PROTO, POJO, or another flexible file format amenable to multiple types of data. The output file format may be JSON or PRO TO format files stored in byte form. That is, the output file format may be different from the input file format, in some embodiments.

The management system 102 may further include a data read module 124 that may read data from the database 104 and/or cache 106 to service a read request from a data source 108. The data read module 124 may service the read request from the cache 106, if the requested data is available from the cache 106, and may instead service the read request from the database 104 if the data is not available from the cache 106. Further, the data read module may invoke the cache write module to "re-hydrate" data into the cache 106 that had previously expired and been deleted from the cache 106.

Figure 2:
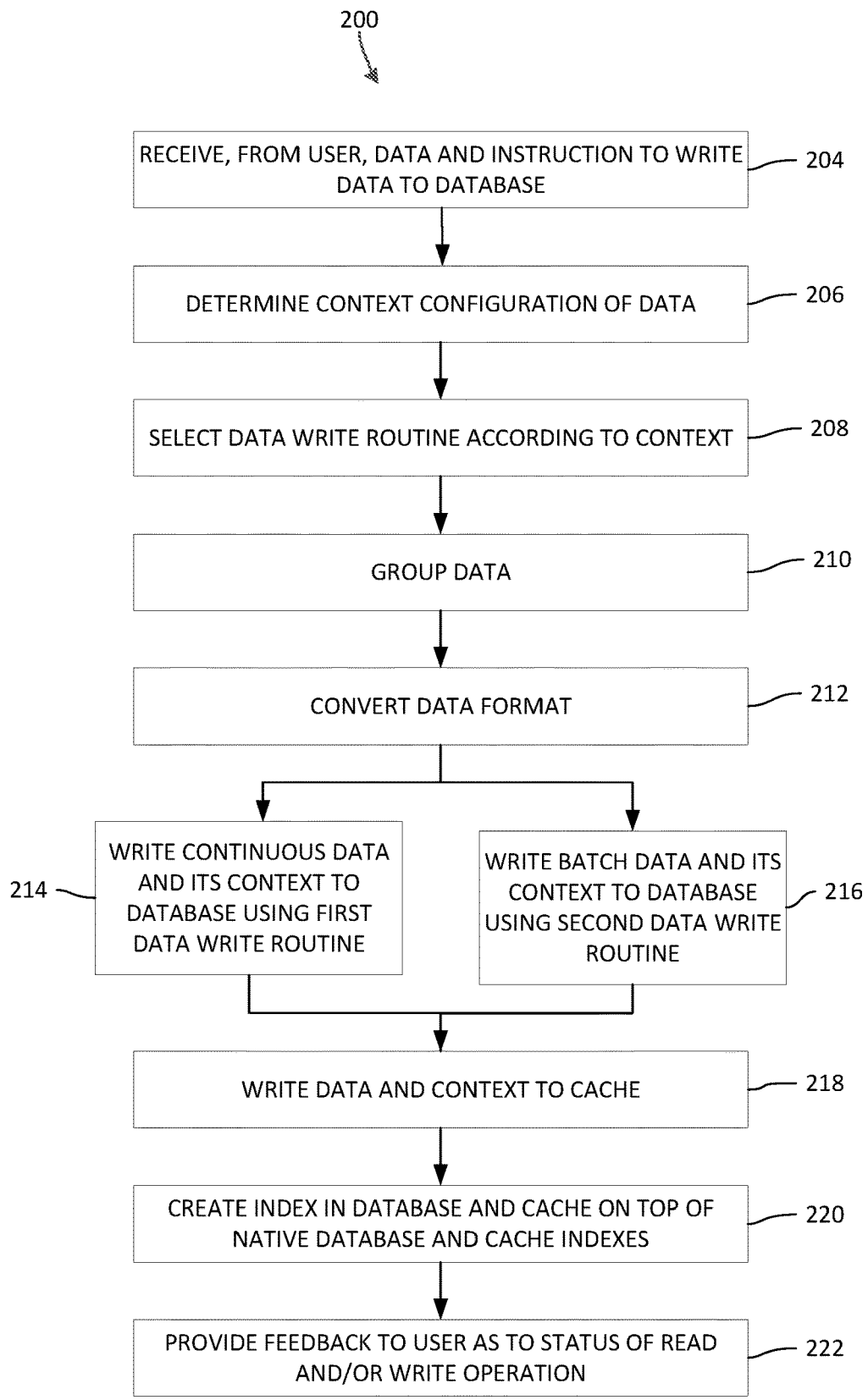
FIG. 2 is a flow chart illustrating an example method of managing a database system.

FIG. 2 is a flow chart illustrating an example method 200 of operating a database system. The method 200, or one or more portions of the method 200, may be performed by the management system 102 of FIG. 1, in some embodiments.

The method 200 may include, at block 204, receiving, from a user, data and an instruction to write the data to a database. The user may be, or may be associated with, a data source, such as a source of continuous or batch data. Block 204 may include, in some embodiments, receiving metadata or instructions from the user such as, for example, an expiration (e.g., TTL configuration), how many times the user wants a failed write to be retried, and/or a group mapping.

The method 200 may further include, at block 206, determining a context of the data. Block 206 may include, in some embodiments, determining if the data is continuous data or batch data. Block 206 may additionally or alternatively include, in some embodiments, reading the metadata or instructions from the user received in block 204. Block 206 may additionally or alternatively include, in some embodiments, creating metadata and associating that metadata with the received data as part of the context of that data. For example, block 206 may include generating a unique identifier and associating that identifier with the data.

In some embodiments, where the received data is continuous data, the method may include segregating the received data into discrete portions, each associated with a particular window of time. Accordingly, as continuous data is received, method 200 may include dividing that continuous data into a plurality of time-slice portions.

The method 200 may further include, at block 208, selecting one or more write routines according to the context determined at block 206. For example, a first database write routine may be selected for continuous data, and a second write routine may be selected for batch data, in some embodiments. In other embodiments, a routine may be selected according to a characteristic of the data context other than whether it is continuous or batch data. For example, block 208 may include selecting a write routine according to an expiration of the data.

The method 200 may further include, at block 210, grouping data, if needed. Grouping data at block 210 may include grouping two or more data records into a data set for a common read or write to or from the database. Grouping may reduce the number of I/O trips to the database, thereby improving database performance.

The method 200 may further include, at block 212, converting the format of the received data according to the selected data write routine and according to the user's instructions. Accordingly, block 212 may include converting the data from an input file format to a storage format that is different from the input file format. For example, for a synchronous or continuous data write, the input file format may be PROTO, POJO, or another flexible file format amenable to multiple types of data, and the output file format may be JSON. For asynchronous or batch data, the input file format may be PROTO, POJO, or another flexible file format amenable to multiple types of data, and the output file format may be PARQUET.

The method 200 may further include, at block 214, if block 208 includes selecting a first write routine for continuous data, writing that continuous data to a database using that first write routine. The first write routine may store a portion of continuous data (e.g., a time slice of the continuous data) in the database in a format different from the input file format provided by the user. Block 214 may additionally include storing the context of the data with the data in the database in association with the data.

The method 200 may further include, at block 216, if block 208 includes selecting a second write routine for batch data, writing that data batch to a database using that second write routine. The second write routine may store the data batch in the database in a format different from the input file format provided by the user. Block 216 may additionally include storing the context of the data with the data in the database in association with the data.

The method 200 may further include, at block 218, writing the data and its context to the cache. Block 218 may involve a third write routine that may store the batch or continuous data portion in the cache a format different from the input file format provided by the user. Accordingly, block 218 may include converting the data from an input file format to a storage format that is different from the input file format. For example, the input file format may be PRO TO, POJO, or another flexible file format amenable to multiple types of data. The output file format may be JSON or PROTO format files stored in byte form. Block 218 may additionally include storing the context of the data with the data in the cache in association with the data.

Notably, the three write routines used at blocks 214, 216, 218 may accept the same input file formats, enabling the user's data to be stored in both the database and the cache in the most efficient file format for each type of data without requiring the user to provide different data types in different formats, or different data types for cache and database storage, enabling faster performance and faster data writes by the database.

The method 200 may further include, at block 220, creating an index in a database and an index in a cache. These additional indexes may be predefined and coupled to the underlying data as part of context metadata. One or both of the database and the cache may be a key value memory store, in embodiments. Block 220 may still further include, for each cache data write operation, updating the index in the cache to reflect the addition or modification of the data stored in the cache. In addition, block 220 may include updating the index in the database in response to each database write operation to reflect the addition or modification of the data stored in the database.

Because context metadata is stored with the data in both the database and the cache, later updates to the data may be performed in the database or cache, and read operations for the data and related data may be performed simply and straightforwardly because the input format type may be included in the context metadata. Storing context metadata may enable simpler later data format changes due to the bitemporal nature of data retrieval. While retrieving data the associated context metadata may identify the schema that was used to persist the data. The system may retrieve the parameters of that schema to convert the data to be presented to client in the requested format. For example, at a time of initial storage of a data set, a schema may include ten attributes, whereas at a time of retrieval, that schema may have been updated to include twelve attributes. The stored metadata may indicate a schema version having ten attributes (or a time associated with the storage, from which it may be determined that the schema had ten attributes at that time). At the time of retrieval, the data can therefore be properly returned in the twelve-attribute schema version, with a proper correspondence of the original ten attributes to the corresponding ten attributes in the twelve attribute schema version.

Why we are doing this? Because the data might be stored in a target format that is not human readable and when retrieval the requester might want it to be presented in human readable format.

In some embodiments, block 214 or 216 may be performed in parallel with block 218, such that data provided by the user is written to the database and to the cache responsive to the user's write command, but without the user specifying that the data be placed in cache.

The method 200 may further include, at block 222, providing feedback to the user as to the status of a data write or data read operation during the read or write operation. Data may be stored using synchronous and/or asynchronous write operations. In an asynchronous write, the storage system may output partial or full status of the data write operation, at the user's option, in some embodiments. Known database systems generally do not provide in-progress status updates on data write operations, particularly on asynchronous operations. Status information may include, for example, a number of records (data and/or associated index information) failed or successfully written, failure reasons for both data write failures, and/or failure reasons for index writes and their associated records. Status information may further include similar information for data replications from cache to database, or data rehydration from database to cache.

Figure 3:
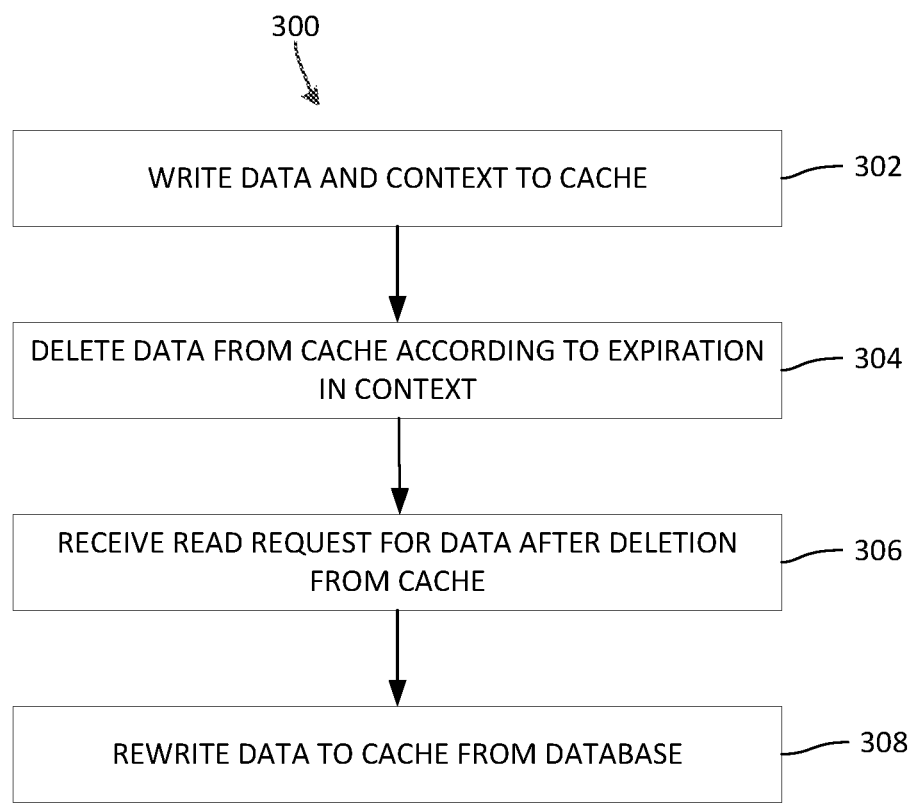
FIG. 3 is a flow chart illustrating an example method of managing a cache within a database system.

FIG. 3 is a flow chart illustrating an example method 300 of operating a cache within a database system. The method 300, or one or more portions of the method 300, may be performed by the management system 102 of FIG. 1, in some embodiments.

The method 300 may include, at block 302, writing data and its context to cache. The data may be a continuous data portion or batch data. The context of the data may include an expiration (e.g., TTL), along with other context information disclosed herein.

The method 300 may further include, at block 304, deleting the data from the cache according to the expiration in the context stored at block 302. For example, where the expiration is an amount of time from initial storage to deletion, block 304 may include deleting the data from cache once that amount of time has passed.

The method 300 may further include, at block 306, receiving a read request for the data after it has been deleted from the cache and, at block 308, rewriting the data to the cache from a database. Such rewriting to cache may be referred to herein as "rehydrating" the data in cache. Block 308 may include reading the data from the database, both to service the read request, and to rewrite the data to the cache. As a result, although the read request received at block 306 may be serviced from the database, future read requests for the data may be serviced from the cache for faster response to such future read requests. The rehydrated data may be stored in cache with context identical to the context that was stored in the database, but with an updated expiration. Accordingly, in some embodiments, block 308 may include determining an expiration and storing that expiration in cache with the context respective of the data. For example, a TTL value identical to the original context of the data may be used.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various presently disclosed embodiments. It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

What is claimed is:

1. A method for operating a database, the method comprising:
   receiving, from a user, data and an instruction to store the data in a key-value based database;
   determining a context of the data;
   selecting, according to the determined context, a data write routine;
   writing the data and the determined context to the database using the selected data write routine; and
   writing the data to a cache associated with the databases;
   wherein:
      the data comprises continuous data;
      the method further comprises segregating the continuous data into a plurality of portions, each portion associated with a respective time window; and
      the context of each portion comprises:
         a unique identifier; and
         one or more of an expiration, an error handling strategy, or a group mapping.

2. The method of claim 1, wherein the data is first data, the context is a first context, and the data write routine is a first data write routine, and the method further comprises:
   receiving, from a user, second data and an instruction to store the second data in the key-value based database, wherein the second data comprises batch data;
   determining a second context of the second data;
   selecting, according to the determined second context, a second data write routine;
   writing the second data and the second context to the database using the selected data write routine; and
   writing the data to a cache associated with the database;
   wherein:
      determining context of the second data comprises identifying the batch data; and
      the context of the batch data comprises:
         a unique identifier; and
         one or more of an expiration, an error handling strategy, or and a group mapping.

3. The method of claim 1, wherein the context comprises an expiration and the method further comprises:
   deleting the data from the cache after the expiration;
   receiving a read request for the data; and
   in response to the read request, rewriting the data to the cache.

4. The method of claim 1, further comprising:
   continuously outputting a status of the database write to the user during the database write.

5. The method of claim 1, further comprising:
   creating an index of the data; and
   storing the index in the database and the cache with the data.

6. The method of claim 1, wherein the context comprises a first input file format, the method further comprising:
   receiving an update to the data from the user with an instruction to write the update to the database, the update in a second file format that is different from the first file format;
   reading the first file format from the stored context; and
   updating the data in the database according to the first and second file formats.

7. A system comprising:
   a database management system comprising a processor and a non-transitory, computer-readable memory, the memory storing instructions that, when executed by the processor, cause the database management system to:
      receive, from a user, data and an instruction to store the data in a key-value based database;
      determine a context of the data;
      select, according to the determined context, a data write routine;
      write the data and the determined context to the database using the selected data write routine; and
      write the data to a cache associated with the database;
   wherein:
      the data comprises batch data;
      determining the context of the data comprises identifying the batch data; and
      the context of the batch data comprises:
         a unique identifier; and one or more of an expiration, an error handling strategy, and a group mapping.

8. The system of claim 7, further comprising:
the database; and
the cache.

9. The system of claim 8, wherein the data is first data, the context is a first context, and the data write routine is a first data write routine, and the memory storing further instructions that, when executed by the processor, cause the database management system to:
receive, from a user, second data and an instruction to store the second data in a key-value based database;
determine a second context of the second data;
select, according to the determined second context, a second data write routine;
write the second data and the determined second context to the database using the selected second data write routine; and
write the data to the cache associated with the database; wherein:
the data comprises continuous data;
the memory stores further instructions that, when executed by the processor, cause the database management system to segregate the continuous data into a plurality of portions, each portion associated with a respective time window; and
the context of each portion comprises:
a unique identifier; and
one or more of an expiration, an error handling strategy, or a group mapping.

10. The system of claim 7, wherein the context comprises an expiration and the memory stores further instructions that, when executed by the processor, cause the database management system to:
delete the data from the cache after the expiration;
receive a read request for the data; and
in response to the read request, rewrite the data to the cache.

11. The system of claim 7, wherein the memory stores further instructions that, when executed by the processor, cause the database management system to:
continuously output a status of the database write to the user during the database write.

12. The system of claim 7, wherein the memory stores further instructions that, when executed by the processor, cause the database management system to:
create an index of the data; and
store the index in the database and the cache with the data.

13. The system of claim 7, wherein the context comprises a first input file format, and the memory stores further instructions that, when executed by the processor, cause the database management system to:

receive an update to the data from the user with an instruction to write the update to the database, the update in a second file format that is different from the first file format;
read the first file format from the stored context; and
update the data in the database according to the first and second file formats.

14. A method for operating a database, the method comprising:
receiving, from a user, data and an instruction to store the data in a key-value based database;
determining whether the data is continuous data or batch data;
selecting, according to whether the data is continuous data or batch data, a data write routine;
writing the data to the database using the selected data write routine;
writing the data to a cache associated with the database; and
updating a non-native index in the database and a non-native index in the cache to reflect the writing of the data;
wherein, when the data is continuous data:
the method further comprises:
segregating the continuous data into a plurality of portions, each portion associated with a respective time window; and
writing, with each portion, a context of the portion to the database and to the cache; and
the context of each portion comprises:
a unique identifier; and
one or more of an expiration, an error handling strategy, or a group mapping
and wherein, when the data is batch data:
the method further comprises writing, with the batch data, a context of the batch data to the database and to the cache; and
the context of the batch data comprises:
a unique identifier; and
one or more of an expiration, an error handling strategy, or a group mapping.

15. The method of claim 14, further comprising, before receiving the data, creating the index in the database and in the cache.

16. The method of claim 14, further comprising:
deleting the data from the cache after an expiration associated with the data;
receiving a read request for the data; and
in response to the read request, rewriting the data to the cache.

* * * * *